United States Patent [19]
Petricca et al.

[11] Patent Number: 6,041,926
[45] Date of Patent: *Mar. 28, 2000

[54] DISPENSING RAZOR BLADE CARTRIDGES USED WITH A HANDLE

[75] Inventors: John D. Petricca, Leominster; Robert A. Trotta, Pembroke, both of Mass.

[73] Assignee: The Gillette Company, Boston, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/802,382

[22] Filed: Feb. 19, 1997

Related U.S. Application Data

[63] Continuation-in-part of application No. 08/630,437, Apr. 10, 1996, Pat. No. 5,787,586.

[51] Int. Cl.⁷ ........................................... B26B 21/24
[52] U.S. Cl. ........................... 206/356; 30/40.2; 30/537; D9/340
[58] Field of Search ................... 30/40, 50, 40.2, 30/537, 540; 206/352, 354, 355, 356; D9/340

[56] References Cited

U.S. PATENT DOCUMENTS

| | | | |
|---|---|---|---|
| D. 231,198 | 4/1974 | Casselli | D9/340 |
| D. 247,349 | 2/1978 | Carr | D9/342 |
| D. 256,996 | 9/1980 | Kiraly | D9/189 |
| D. 256,997 | 9/1980 | Motta | D9/189 |
| D. 256,998 | 9/1980 | Motta | D9/189 |
| D. 324,299 | 3/1992 | Bowman | D9/340 |
| D. 343,026 | 1/1994 | Dallaire et al. . | |
| D. 366,611 | 1/1996 | Poisson | D9/342 |
| 2,741,028 | 4/1956 | Carter . | |
| 3,311,975 | 4/1967 | De Longuyon . | |
| 3,363,312 | 1/1968 | Fayed . | |
| 3,374,540 | 3/1968 | DeLonguyon . | |
| 3,388,831 | 6/1968 | Hansom . | |
| 3,771,223 | 11/1973 | Dawidowicz et al. | 30/40 |
| 3,783,510 | 1/1974 | Dawidowicz et al. | 30/50 |
| 3,797,657 | 3/1974 | Petrillo | 206/356 |
| 3,835,532 | 9/1974 | Petrillo | 30/40.2 |
| 3,854,201 | 12/1974 | Dawidowicz et al. | 30/40.2 |
| 3,878,605 | 4/1975 | Braginetz . | |
| 3,879,844 | 4/1975 | Griffiths | 30/47 |

(List continued on next page.)

FOREIGN PATENT DOCUMENTS

| | | |
|---|---|---|
| 1160542 | 8/1969 | United Kingdom . |
| WO 94 08762A | 4/1994 | WIPO . |
| WO 95 10398A | 4/1995 | WIPO . |

OTHER PUBLICATIONS

PCT/US98/02949 International Search Report dated Jun. 9, 1998.

"Plastics Processing" W. Michaeli, pp. 188–189. Hanser Publishers, New York.

*Primary Examiner*—Hwei-Siu Payer
*Attorney, Agent, or Firm*—Fish & Richardson P.C.

[57] ABSTRACT

A cartridge dispenser for razor blade cartridges including latches that retain cartridges in predetermined positions permitting connection to a handle connecting structure on a handle as the handle is moved toward the cartridge, each latch having a latch camming structure that is shaped and positioned to interact with corresponding handle camming structure so as to cause the latch to be deflected and to unlatch a cartridge as the handle is moved toward and connected to cartridge connecting structure of a cartridge. The dispenser also has blade unit dividers that extend from the base, are substantially perpendicular to the base, and define blade unit regions in which the blade units are received, and angled dividers that extend from the ends of respective blade unit dividers at acute angles with the base and define angled regions through which the blade units pass in delivery to and removal from the blade unit regions and in which the cartridge connecting structure is received.

36 Claims, 8 Drawing Sheets

U.S. PATENT DOCUMENTS

| | | |
|---|---|---|
| 4,037,322 | 7/1977 | Bresler . |
| 4,043,035 | 8/1977 | Pentney ................................. 30/40.2 |
| 4,163,316 | 8/1979 | Hagmann et al. . |
| 4,173,285 | 11/1979 | Kiraly et al. . |
| 4,227,302 | 10/1980 | Torrance . |
| 4,411,065 | 10/1983 | Trotta . |
| 4,413,411 | 11/1983 | Trotta . |
| 4,422,237 | 12/1983 | Trotta . |
| 4,446,619 | 5/1984 | Jacobson . |
| 4,514,904 | 5/1985 | Bond . |
| 4,742,909 | 5/1988 | Apprille, Jr. et al. .................. 206/356 |
| 4,905,372 | 3/1990 | Willis . |
| 5,016,352 | 5/1991 | Metcalf . |
| 5,107,590 | 4/1992 | Burout, III et al. . |
| 5,269,062 | 12/1993 | Dallaire et al. . |
| 5,347,717 | 9/1994 | Ts'ai . |
| 5,469,621 | 11/1995 | Alsept et al. . |
| 5,518,114 | 5/1996 | Kohring et al. . |
| 5,787,586 | 8/1998 | Apprille, Jr. et al. ....................... 30/47 |

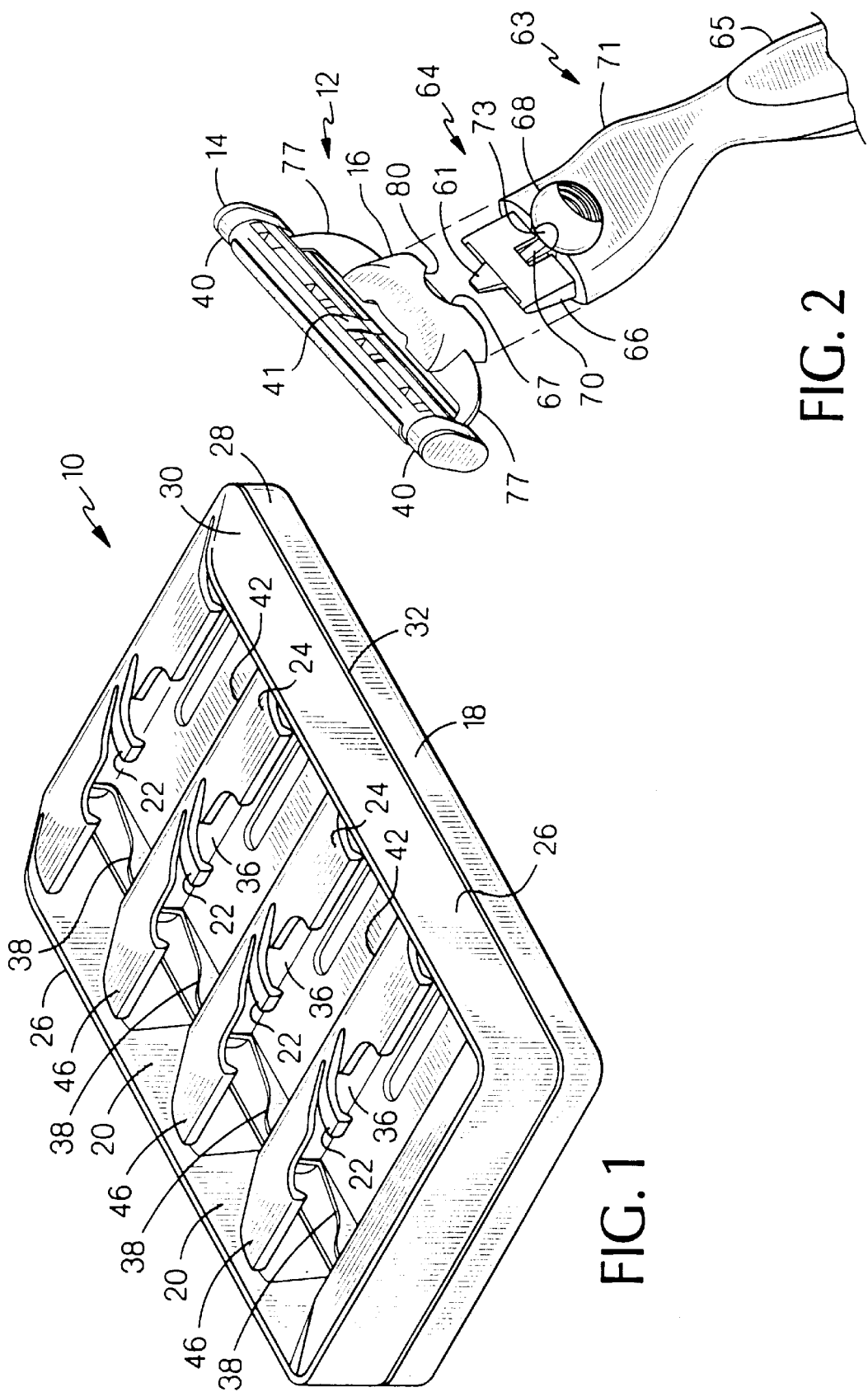

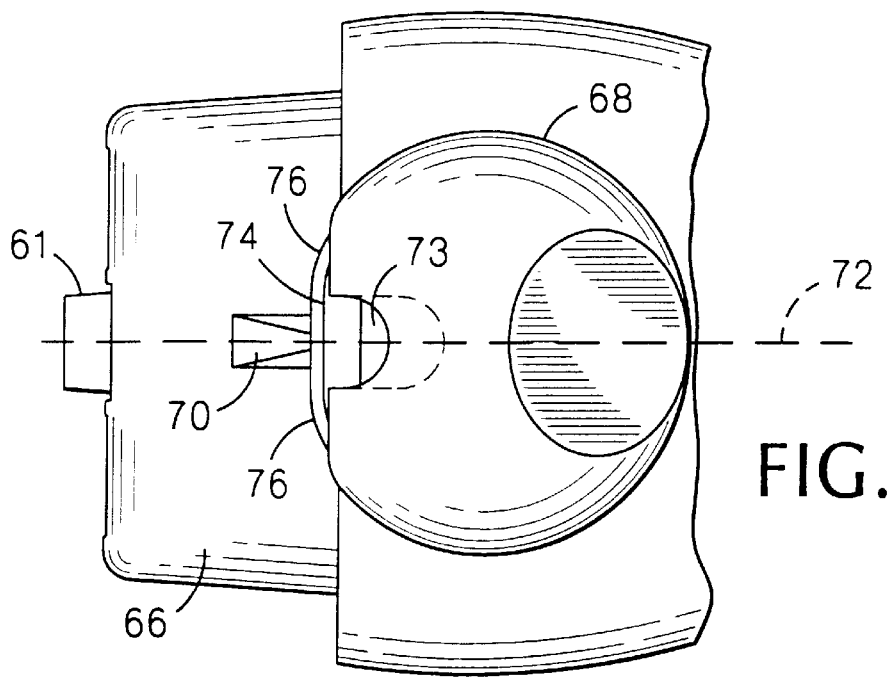
FIG. 7
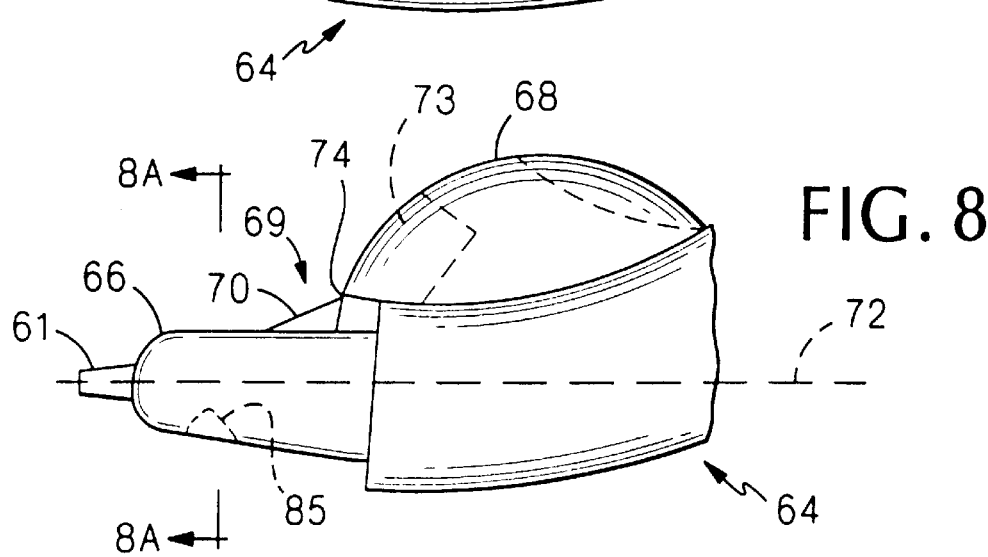
FIG. 8
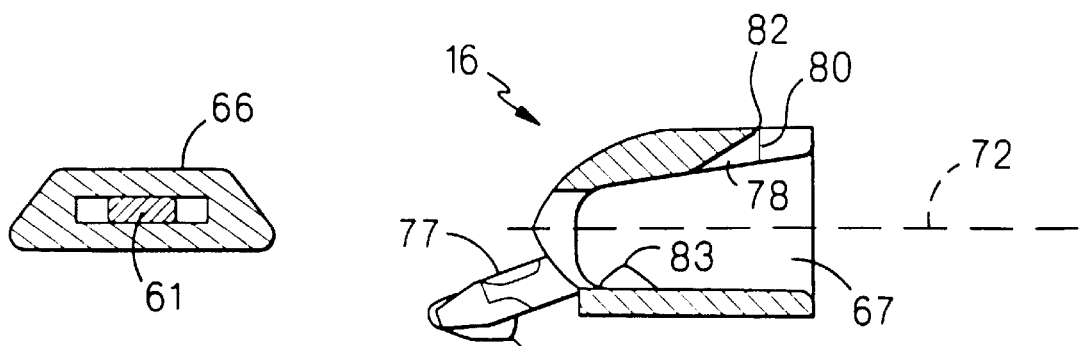
FIG. 8A
FIG. 9

DISPENSING RAZOR BLADE CARTRIDGES USED WITH A HANDLE

This application is a continuation-in-part of U.S. patent application Ser. No. 08/630,437, filed Apr. 10, 1996 entitled "SHAVING SYSTEM AND METHOD", now U.S. Pat. No. 5,787,586.

BACKGROUND OF THE INVENTION

The invention relates to dispensing razor blade cartridges from a dispenser onto a handle.

Razor blade cartridges are typically removed from a dispenser by connecting the handle to the cartridge while the cartridge is still retained in the dispenser. The user then pivotally moves the handle with respect to the dispenser, using the leverage of the handle against a friction or interference fit of a projection that holds the cartridge body, and frees the cartridge from the dispenser. When the cartridge is of a type that has a pivotal connection to the handle, the user must pivot the handle beyond the range of motion allowed by the pivotal connection before leverage is applied to the friction or interference fit.

SUMMARY OF THE INVENTION

In one aspect, the invention features, in general, a dispenser for razor blade cartridges used with a handle. The dispenser has a housing structure that defines sections for receiving respective cartridges and retaining the cartridges in predetermined positions that permit connection of a handle connecting structure on the handle to one of the cartridges as the handle is moved toward the cartridge. The dispenser also has a latch for each section. Each latch has a latch camming structure that is shaped and positioned to interact with a corresponding handle camming structure on the handle, causing the latch to be deflected and to release the cartridge as the handle is moved toward and connected to cartridge.

In another aspect, the invention features in general a dispenser having a housing structure that includes a base and a plurality of angled cartridge dividers that define angled sections for receiving respective cartridges.

Certain implementations of the invention may include one or more of the following features. In certain implementations, each latch has a resilient cantilevered arm that extends from a cartridge divider and has an end with a cam follower and a blocking surface that is substantially perpendicular to the arm for blocking removal of the cartridge. The cartridge dividers include blade unit dividers that extend from the base, are substantially perpendicular to the base, and define blade unit regions in which the blade units are received. The cartridge dividers also include angled dividers that extend from the ends of respective blade unit dividers at acute angles with the base and define angled regions through which the blade units pass in delivery to and removal from the blade unit regions and in which the cartridge connecting structure is received. An angled region of one section partially overlies a blade unit region of an adjacent section. The angled cartridge dividers have first portions that extend between the side walls closer to the base and second portions that extend upward from the first portions but are not connected to the side walls. The angled dividers make an angle of greater than 30° with the base. The dispenser has drainage holes associated with respective sections. The dispenser has raised members on which end structures (e.g., clips) of the cartridge are supported so as to avoid contact of the blades with the dispenser.

In another aspect, the invention features, in general, a handle for connecting to a replaceable razor cartridge held in a predetermined position in a dispenser by a latch. The handle has a hand engageable portion and a handle connecting structure at the upper end of the handle that makes connection to the cartridge by movement along a connection axis toward the cartridge in the dispenser. The handle connecting structure includes a handle camming structure that is shaped and positioned to interact with a corresponding latch camming structure on the latch on the dispenser so as to cause the latch to be deflected and to release the cartridge as the handle is moved along the connection axis toward and is connected to the cartridge.

In certain implementations of the invention, the handle connecting structure fits within a cartridge connecting structure on the cartridge, and the handle connecting structure is asymmetrical so as to guarantee proper alignment of a cam surface on the handle with a cam follower on the dispenser as the handle is moved toward and is connected to the cartridge. The handle carries a button used to eject the cartridge; the button is located on a platform adjacent to the cam surface and has a recessed region in line with the cam surface to provide a space to receive the latch during or after connection of the handle to the cartridge.

In another aspect, the invention features, in general, a replaceable razor blade cartridge that includes a blade unit and a cartridge connecting structure for connecting the blade unit to a handle by movement of the handle along a connection axis toward the cartridge connecting structure. The cartridge connecting structure includes a recessed portion for receiving a cam surface on the handle as the handle is moved along the connection axis.

In another aspect, the invention features, in general, a replaceable razor blade cartridge that includes a blade unit and a cartridge connecting structure for connecting the blade unit to a handle by movement of the handle along a connection axis toward the cartridge connecting structure. The cartridge connecting structure includes a cutaway portion functioning as a keyway for receiving a mating key structure on the handle as the handle is moved along the connection axis to enhance proper orientation of the handle.

In another aspect, the invention features, in general, a replaceable razor blade cartridge that includes a blade unit and a cartridge connecting structure for connecting the blade unit to a handle by movement of the handle along a connection axis toward the cartridge connecting structure. The blade unit includes an elongated housing and a cross bar that is parallel to the connection axis and is perpendicular to the longitudinal axis of housing at a bottom portion of the housing. The cartridge connecting structure includes a latching portion for engagement by a latch on a cartridge dispenser. The latching portion is aligned with the cross bar, so that the cross bar is aligned with the latch upon removal of the cartridge from the dispenser.

In certain implementations of the invention, the cartridge connecting structure has inwardly directed surfaces that define a flat-shaped region for insertion of a flat-shaped handle connecting structure. The cartridge connecting structure has an engagement structure providing a releasable (e.g., snap-fit) connection to the handle. The engagement structure is a projection for mating with a matching depression on the handle.

In another aspect, the invention features, in general a razor including a handle with a cam surface and a cartridge with a recessed portion for receiving the cam surface on the handle as the handle is moved along a connection axis during connection of the cartridge to the handle.

In another aspect, the invention features, in general, the combination of a cartridge dispenser, a cartridge stored in the dispenser, and a handle. The dispenser has a latch that releasably holds the cartridge stored on the dispenser in a latched position and has a latch camming structure. The handle has a handle camming structure that interacts with the latch camming structure to cause the latch to be deflected from the latched position and to release the cartridge as the handle is moved toward and connected to the cartridge. The handle also includes a platform on which the latch rides in an unlatched position after the latch has released the cartridge prior to removal of the connected cartridge from the dispenser.

In another aspect, the invention features, in general, the combination of a cartridge dispenser and a cartridge in the dispenser. The cartridge has a blade unit and a cartridge connecting structure that is movably connected to the blade unit. The dispenser has a housing structure that supports the blade unit and a latch that engages the cartridge connecting structure. The housing structure and the latch hold the cartridge in an immobile position ready to be unlatched and connected to a handle.

In another aspect, the invention features, in general, a method of using a replaceable razor cartridge. The cartridge is stored in a dispenser. Handle connecting structure of a handle is moved toward cartridge connecting structure of the cartridge along a connection axis to connect the cartridge to the handle. Thereafter the cartridge is removed from the dispenser while connected to the handle by retracting the handle substantially along a retraction axis, which preferably is the same as the connection axis used for connecting the handle to the cartridge.

In certain implementations the cartridge, after use, is replaced in the same or a different dispenser by moving the handle and connected cartridge along the same or a different connection axis. The cartridge is disconnected from the handle, and the handle is retracted while the cartridge remains in the dispenser.

In another aspect, the invention features, in general, a method of connecting a replaceable razor cartridge to a handle in a proper orientation. The cartridge is stored in an angled region between a front angled divider and a rear angled divider in a dispenser. The dividers are generally parallel to each other, and the cartridge has a cartridge connecting structure with a cartridge connection axis that passes between the front and rear angled dividers. Handle connecting structure of a handle is moved toward the cartridge connecting structure of the cartridge along the connection axis to connect the cartridge to the handle. The handle has asymmetrical geometry with respect to the connection axis such that a blocking structure on the handle will be on the side of the axis closer to the rear divider and will be blocked by the rear angled divider when the handle is in an improper orientation, and the blocking structure on the handle will be on the side of the axis away from the rear divider and will be clear of the rear angled divider when the handle is in a proper orientation.

In certain implementations: the blocking structure includes a button carried on the handle; the handle connecting structure is offset from an elongated hand gripping structure of the handle by a transition portion, and the blocking structure includes the transition portion.

In another aspect, the invention features, in general, a method of using a replaceable razor cartridge. The cartridge is stored in a dispenser. Handle connecting structure of a handle is connected to cartridge connecting structure of the cartridge, and the cartridge is removed from the dispenser while connected to the handle by retracting the handle along a retraction axis. The dispenser includes a resilient member that exerts a biasing force on the cartridge connecting structure as the cartridge is removed, and the biasing force has a component along the retraction axis to assist in ejecting the cartridge from the dispenser.

In another aspect, the invention features, in general, a method of connecting a replaceable razor cartridge to a handle. The method includes storing the cartridge in a dispenser having a latch that retains a cartridge connecting structure of the cartridge. A handle connecting structure of the handle is moved toward the cartridge connecting structure along a connection axis. The latch is automatically moved to an unlatched position with a handle camming structure that interacts with a latch camming structure as the handle is moved toward and is connected to the cartridge connecting structure.

In another aspect, the invention features, in general, making a dispenser for razor blade cartridges by permanently connecting a bottom plastic part and a top plastic part that together define sections for receiving respective razor blade cartridges.

In certain implementations of the invention, the top part and the bottom part are connected by ultrasonically welding; and blade unit dividers on the bottom part are ultrasonically welded to angled dividers on the top part.

Embodiments of the invention may have one or more of the following advantages. Handles are easily connected to new cartridges, and the cartridges are automatically unlatched from the dispenser during connection of the handle to the cartridge. The use of blade unit regions and overlying angled regions provides for conserved space along the base of the dispenser and efficient placement of cartridges for a given peg space requirement for the dispenser. The user is prevented from connecting the handle to a cartridge in the wrong orientation owing to asymmetrical features of the handle; these features can include one or more of: asymmetrical connecting sections on the handle and cartridge, mating key/keyway features on the cartridge and handle connecting structures, and blocking structure on the handle (e.g., an ejector button on one side or an offset transition portion) that will be blocked by a rear angled divider when the handle is in the wrong orientation but will not be blocked when in the proper orientation.

Other advantages or features of the invention will be apparent from the following description of an embodiment thereof and from the claims.

BRIEF DESCRIPTION OF THE DRAWING

FIG. 1 is a perspective view of a dispenser for razor blade cartridges.

FIG. 2 is a perspective view showing a replaceable razor cartridge aligned with a handle (shown as a partial view) on which the cartridge is connected for use.

FIG. 7 is a plan view of a handle connecting structure at the upper end of the FIG. 2 handle.

FIG. 8 is an elevation of the FIG. 7 handle connecting structure.

FIG. 8A is a vertical sectional view, taken at 8A—8A of FIG. 8, of the end of the FIG. 7 handle connecting structure.

FIG. 9 is a sectional view of a cartridge connecting structure of the FIG. 2 cartridge.

DESCRIPTION OF THE PREFERRED EMBODIMENT

Figure 3:
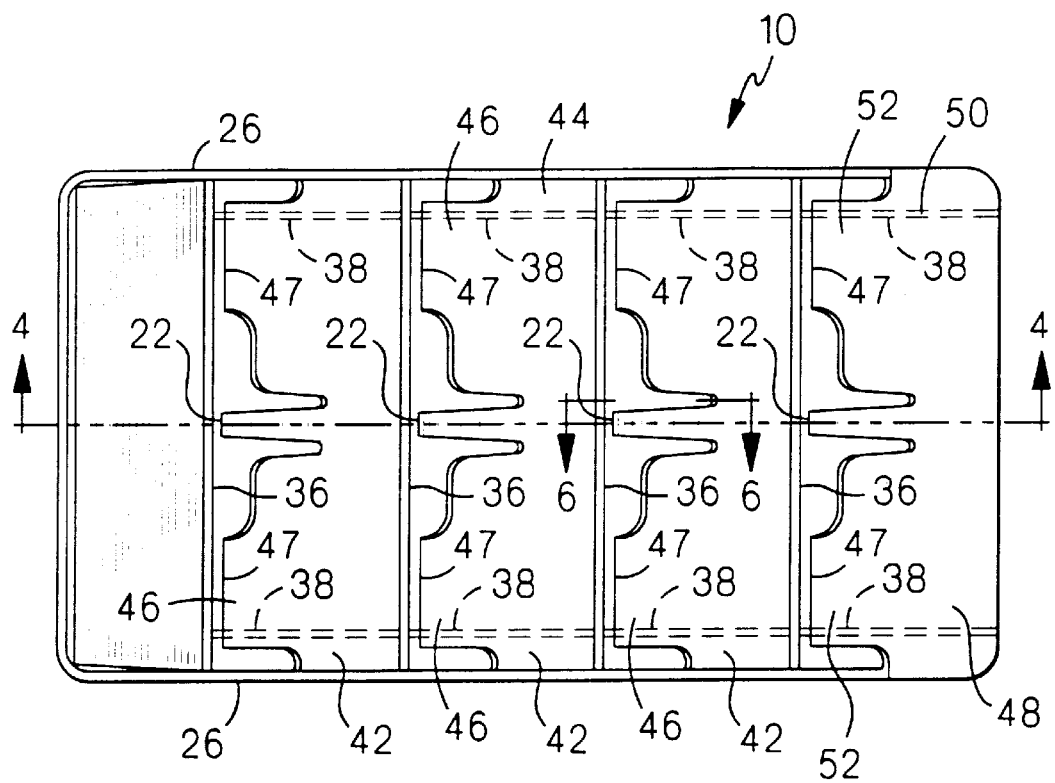
FIG. 3 is a plan view of the FIG. 1 dispenser.

Referring to FIGS. 1–4, there is shown cartridge dispenser 10 (FIG. 1) for storing razor blade cartridges 12 (FIG. 2), which each have blade unit 14 that is pivotally connected to cartridge connecting structure 16. Dispenser 10 includes housing structure 18 that defines sections 20 for receiving cartridges 12 and latches 22 associated with sections 20 to retain each cartridge 12 in a respective section 20. Sections 20 are defined by cartridge dividers 24 and side walls 26 of housing structure 18. Each cartridge divider 24 includes a perpendicular blade unit divider portion 36, at the bottom, and angled divider portion 42 above it.

Figure 4:
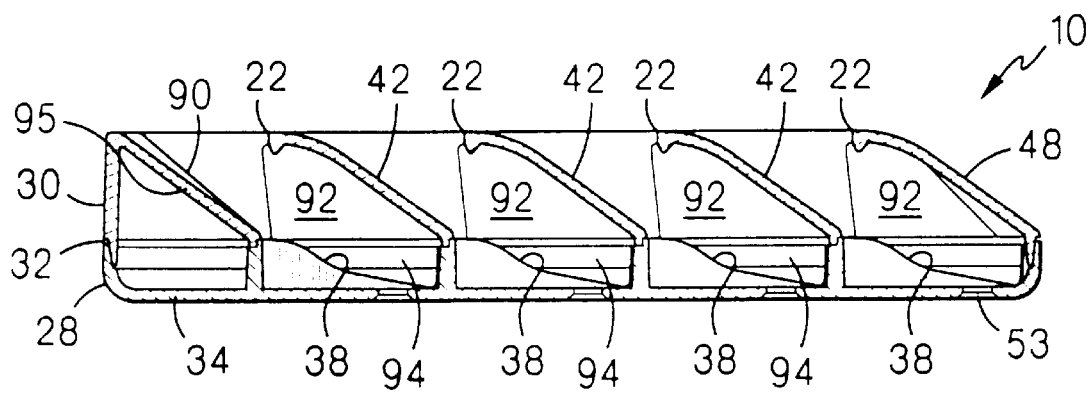
FIG. 4 is a vertical sectional view, taken at 4—4 of FIG. 3, of the FIG. 1 dispenser.
Figure 5:
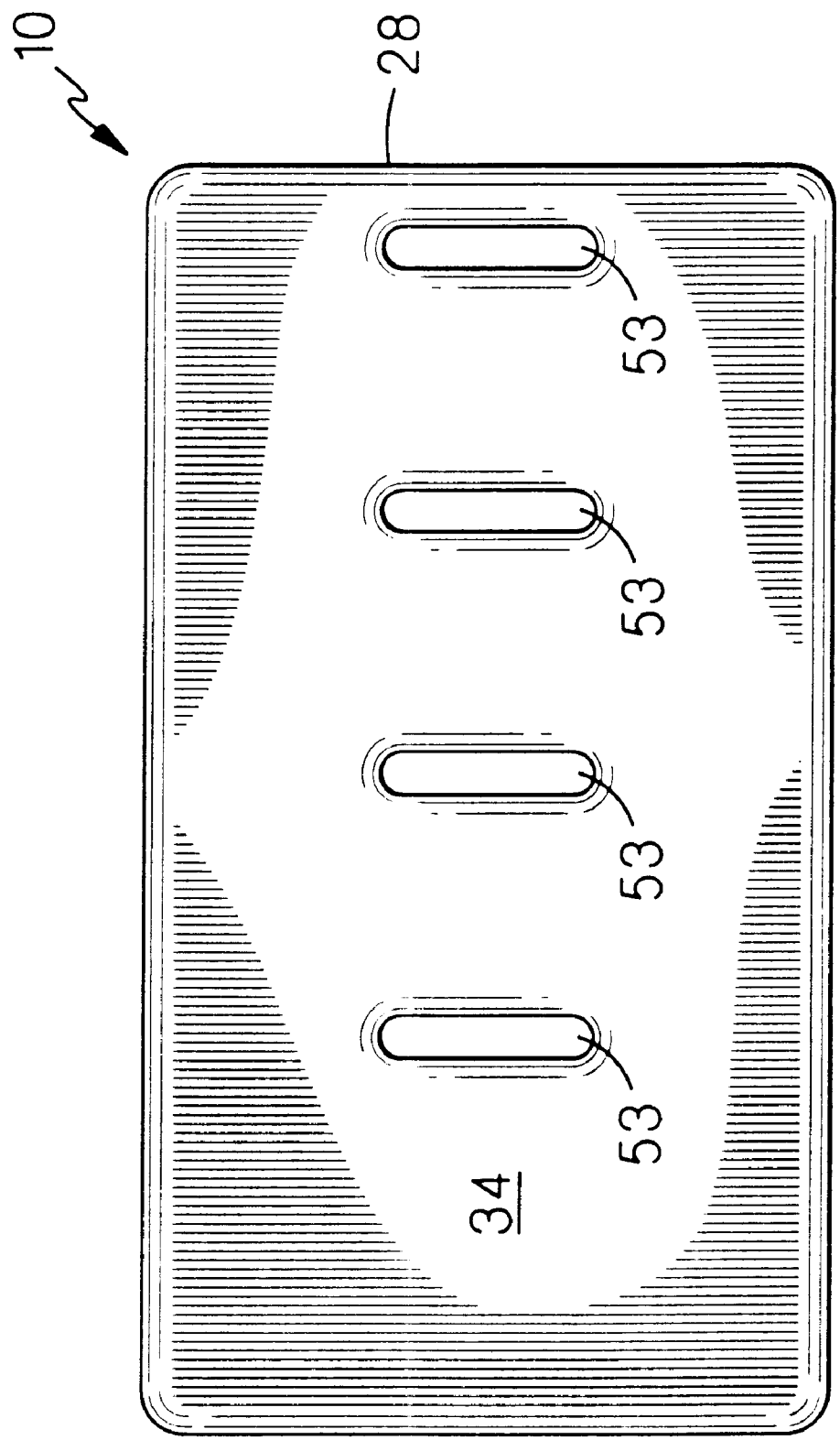
FIG. 5 is a bottom view of the FIG. 1 dispenser.

Dispenser 10 is made of two molded parts 28, 30, that are joined together by ultrasonic welding at seam 32 (FIG. 4). Bottom part 28 includes base 34, perpendicular blade unit divider portions 36, and contoured cartridge supports 38 spaced slightly in from side walls 26 (FIGS. 3, 4). Cartridge supports 38 are contoured to support and are aligned with clips 40 on cartridges 12 (FIG. 2) at the ends of blade unit 14 in order to avoid contact of the blades that are retained under clips 40 with the dispenser. Referring to FIG. 5, it is seen that base 34 has drainage openings 53 that are each associated with a section 20 for receiving a respective cartridge 12.

Referring to FIGS. 3–4, upper part 30 includes angled dividers 42, which each include a lower portion 44 that extends between side walls 26 and two upper portions 46 that are not connected to side walls 26 in order to permit flexure of upper portions 46. Alternatively, upper portions 46 can be connected to side walls 26; having a space between upper portions 46 and side walls 26 is optional. Upper portions 46 have tops 47. Between the two upper portions 46 of each angled divider portion 42 is a latch 22 that extends upward from lower portion 44. Front wall 48 similarly has lower portion 50 between side walls 26, two free standing upper portions 52, and latch 22 therebetween. Upper portions 46, 52 have spaces nearby the ends of latches 22 to receive the connecting structures of the cartridge and handle during connection and disconnection.

Figure 6:
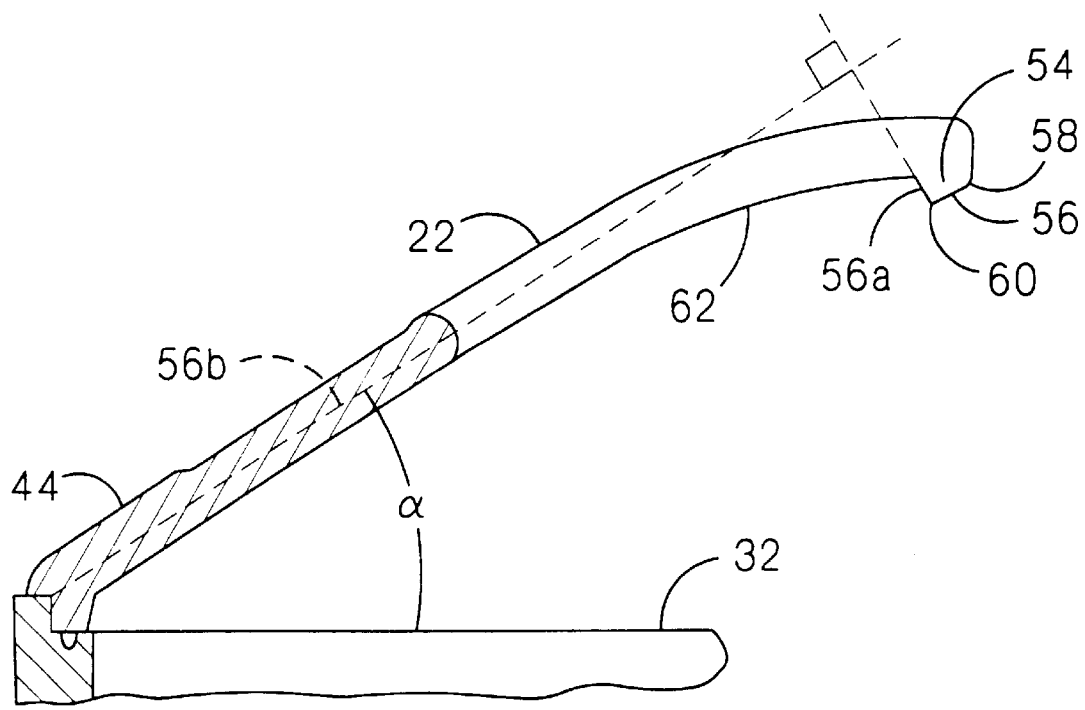
FIG. 6 is a vertical sectional view, taken at 6—6 of FIG. 3, of an angled divider and latch of the FIG. 1 dispenser.

Referring to FIG. 6, axis 56b extending through the lower portion 44 of angled divider portion 42 and the portion of latch 22 extending therefrom make a 35° angle α with connection seam 32 and base 34 thereunder. The angle a α should be no less than 30°; a value of about 35° provides a good balance between providing a sufficient number of cartridges in the lengthwise dimension of dispenser 10 (relating to peg space on a point of purchase display rack) and avoiding undue thickness for dispenser 10. I.e., additional sections 20 for cartridges 12 could be provided by increasing the angle α to a higher angle up to 90°, but the thickness of dispenser would be increased accordingly. A value of about 30° is believed to provide a lower boundary permitting access to cartridge 12 given angular orientation of blade unit 14 with respect to cartridge connecting structure 16. The free end of latch 22 curves slightly and terminates in latch camming structure 54. This structure includes a cam follower defined by end surface 56, and the junctions 58, 60 of surface 56 with the adjacent surfaces. One adjacent surface is blocking surface 56a, which makes a 90 degree angle with longitudinal axis 56b through lower portion 44. Adjacent to blocking surface 56a is retaining surface 62, which contacts latching portion 82 of cartridge connecting structure 16 (FIG. 10), as discussed below.

Referring to FIG. 2, handle 63 includes elongated, straight hand gripping portion 65 and handle connecting structure 64 at the upper end of hand gripping portion 65. Generally flat extension 66 of structure 64 is designed to fit within mating recess 67 in cartridge connecting structure 16 (FIG. 9), both of which have a trapezoidal shape. Handle connecting structure 64 is offset from hand gripping portion 65 and connected to it by transition portion 71. Handle connecting structure 64 includes spring biased plunger 61, for biasing pivotal blade unit 14 at a cam surface on cross bar 41, and button 68, used to extend a presser from a forward end of extension 66 (not shown in FIG. 2) to eject cartridge 12 from handle 63. The details of the structure and operation of cartridge 12 and handle connecting structure 64, the interaction of plunger 61 and the cam surface on cross bar 41, and the connection and disconnection of the cartridge 12 and handle 63 are described in Ser. No. 08/630,437, filed Apr. 10, 1996, and a patent application entitled "Shaving Razor and Method" filed concurrently herewith, which are incorporated by reference as if fully set forth herein.

Figure 11:
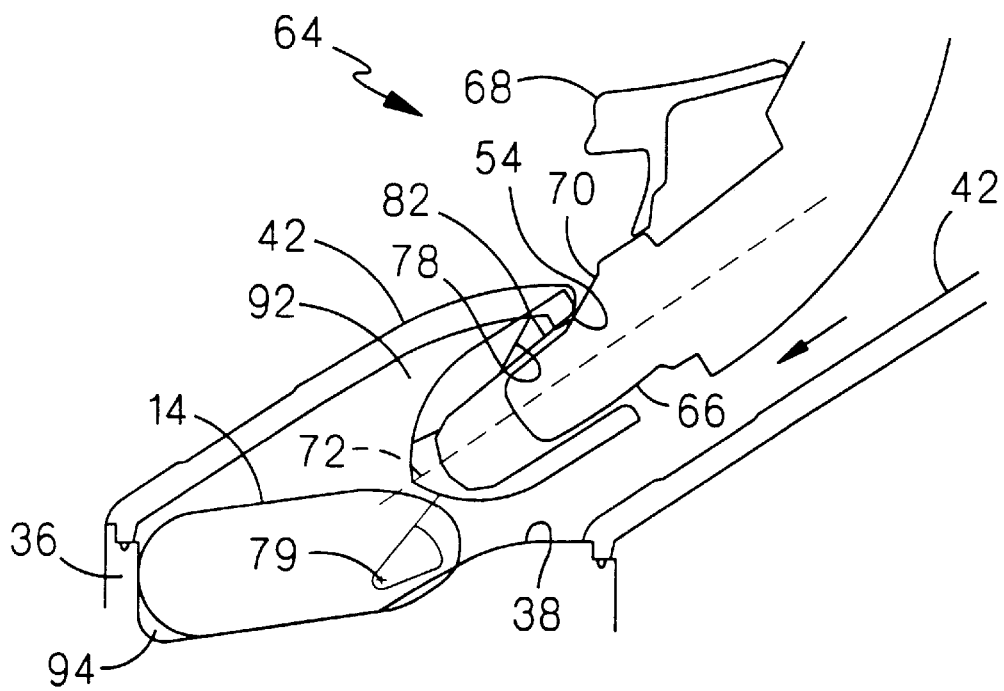
FIGS. 11–16 are illustrations showing the positions of the cartridge, dispenser components, and handle during connection of the handle to a cartridge in the FIG. 1 dispenser and removal of the connected cartridge from the dispenser.

Referring primarily to FIGS. 7 and 8, handle connecting structure 64 of handle 63 includes handle camming structure 69 having cam surface 70 for acting against cam follower structure 54 (surface 56 and junctions 58, 60) of latch 22 (FIG. 6) as extension 66 is inserted into recess 67 (FIG. 9) of a cartridge 12 contained within dispenser 10 (FIG. 11). As shown in FIG. 8, surface 70 makes an acute angle (about 22°) with connection axis 72. Handle connecting structure 64 includes platform portion 74 with generally semicircular portions 76 on both sides of cam surface 70, and cartridge connecting structure 16 has cutaway portion 80 (FIGS. 2, 9) with a matching shape for receiving platform 74 of handle connecting structure 64. Cutaway portion 80 functions as a keyway for mating platform portion 74 on handle 63 to guarantee proper alignment of cam surface 70 and the cam follower structure of latch 22 as well as proper orientation of handle 63 during connection to cartridge 12.

Figure 14:
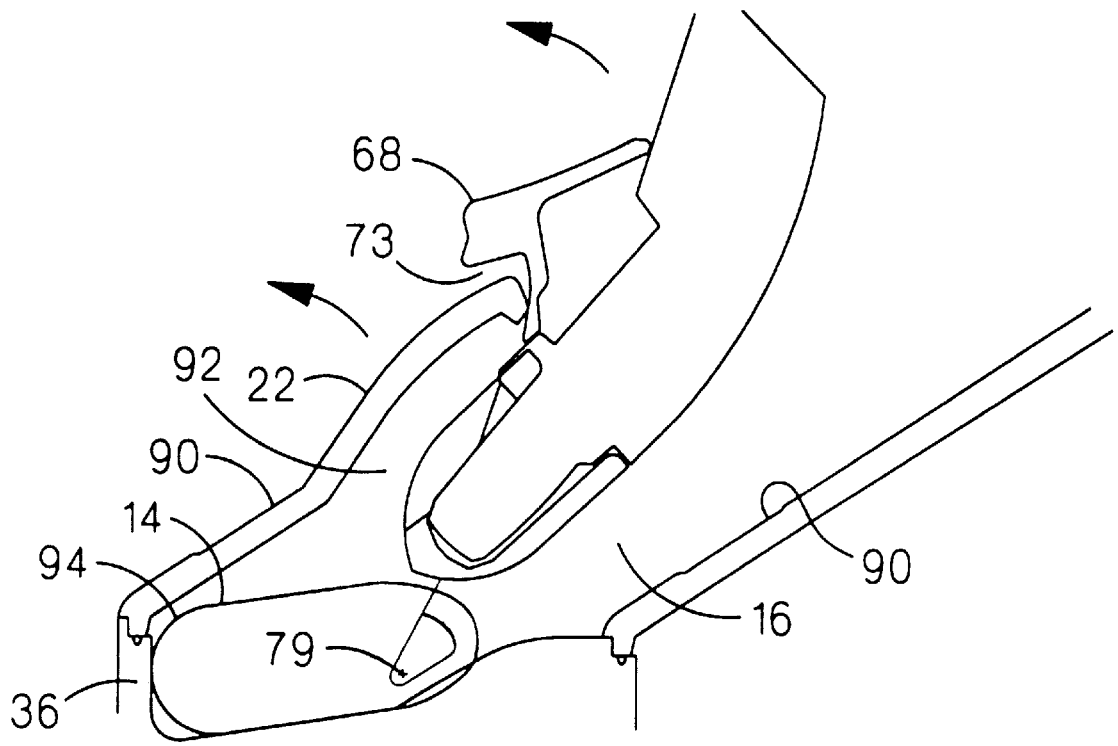

As shown in FIG. 8A, extension 66 has an asymmetrical shape in a planar section perpendicular to connection axis 72 (FIGS. 7–8) through its outwardly directed surfaces; recess 67 (FIG. 9) in cartridge connecting structure 16 of cartridge 12 has the same shape in a planar section perpendicular to connection axis 72 through its mating inwardly directed surfaces. The asymmetrical shapes, like the mating platform and cutaway portions just mentioned, also enhance proper alignment of cam surface 70 and cam follower structure 54 of latch 22 as well as proper orientation of handle 63 and cartridge 12 during connection. Button 68 has recessed region 73 in line with cam surface 70 to provide a space to receive latch 22 during and after connection of handle connecting structure 64 with the connecting structure 16 of cartridge 12, when handle 63 is in a tilted forward orientation (FIG. 14).

Figure 10:
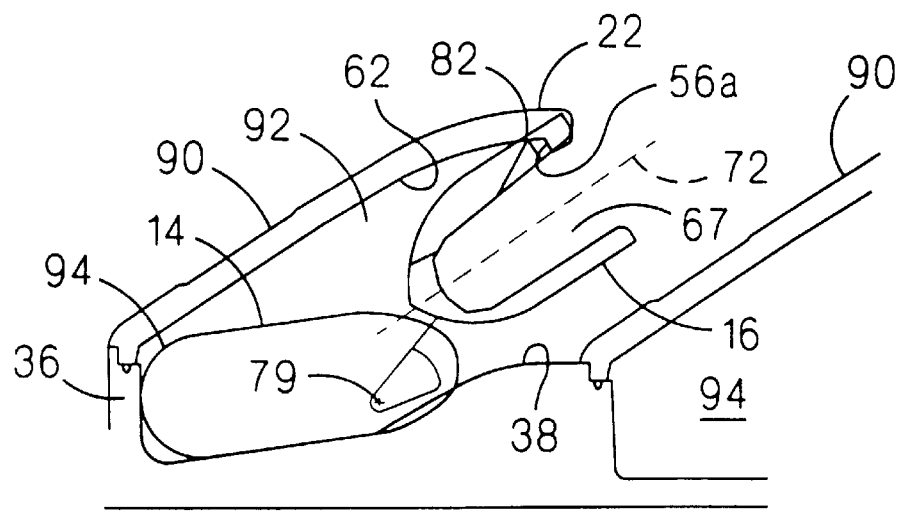
FIG. 10 is an illustration showing the position of a FIG. 2 cartridge stored between dividers in a section of the FIG. 1 dispenser.
Figure 12:
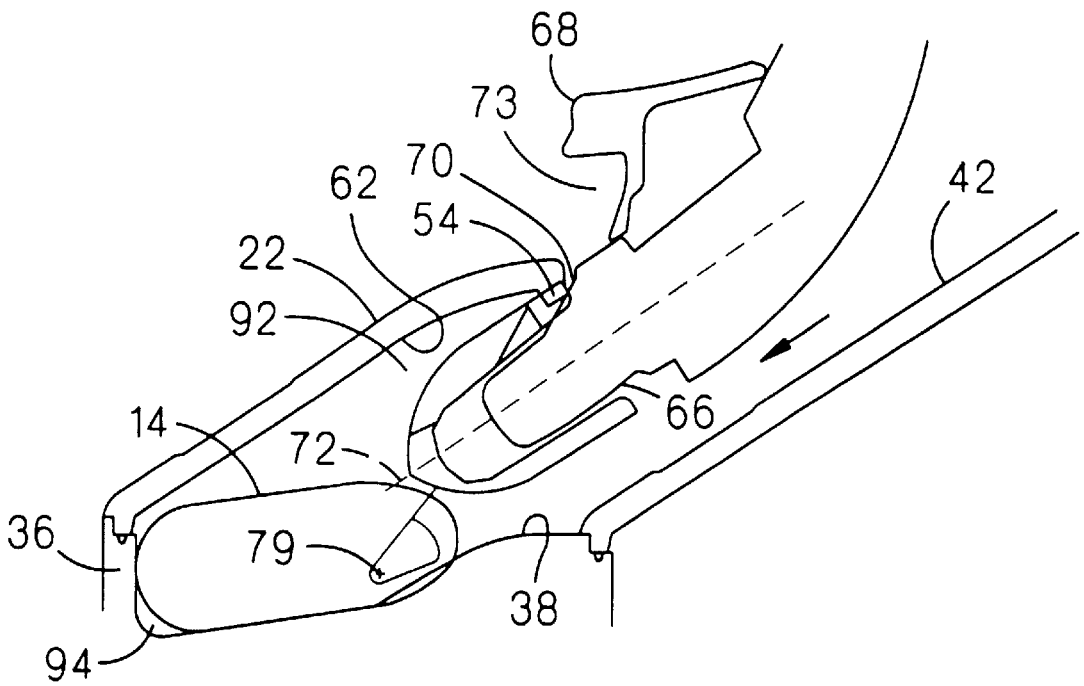
Figure 13:
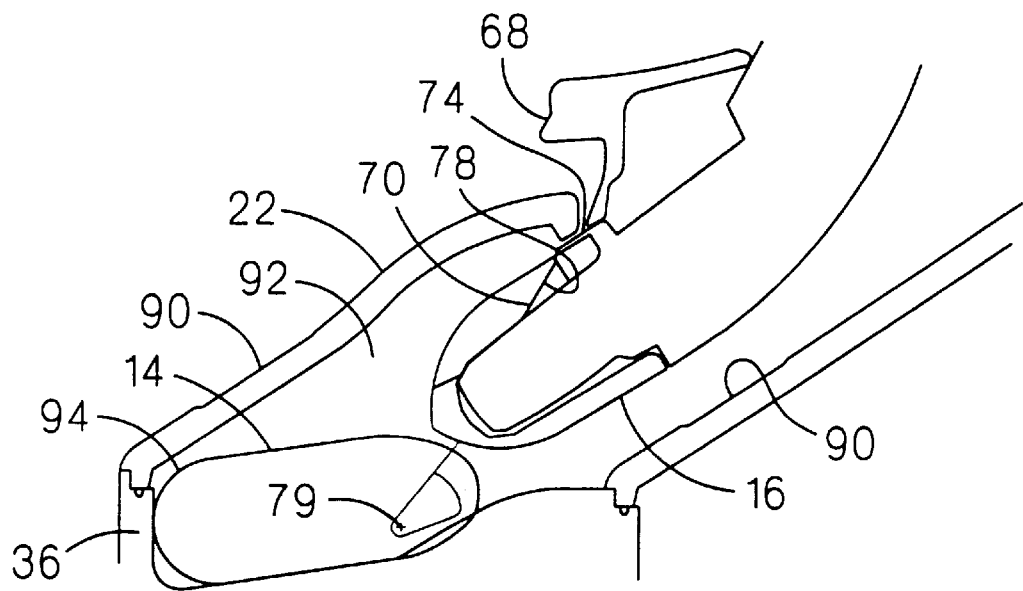

Referring to FIG. 9, it is seen that cartridge connecting structure 16 has recessed region 78 for receiving cam surface 70 of handle 63 as handle 63 is moved along connection axis 72 (FIGS. 12, 13). Cartridge connecting structure 16 also has latching portion 82, located at the junction of the top of recessed region 78 and the center of cutaway portion 80. Latching portion 82 is contacted by retaining surface 62 of latch 22 when retained in dispenser 10 (FIGS. 6, 10). Cartridge connecting structure 16 also has two detents 83 for mating with two depressions 85 (FIG. 8) on handle 63. Extending from the end of cartridge connecting structure 16 are two arms 77 with pivots 79 (only one arm and one pivot are shown in FIG. 9) that make a pivotal connection with blade unit 14 (FIG. 2), as is described in detail in the above-referenced patent application U.S. Ser. No. 08/630,437.

In loading a cartridge 12 into a respective section 20, the bottom of each blade unit 14 is guided by upper surface 90 of divider 42 (or of back angled wall 95) (FIGS. 4, 10) and passes through angled region 92 into blade unit region 94. (Surfaces 90 thus include the upper surfaces of both lower portion 44 and upper portion 46 of dividers 42.) The bottom of blade unit 14 is also guided along the upper countoured surfaces of cartridge supports 38 and rests on supports 38 with the front of the blade unit resting against blade unit divider portion 36. As shown in FIG. 4, cartridge supports have an initial generally horizontal portion, followed by a first angled portion, followed by a second angled portion at a smaller angle. As shown in FIG. 10, pivotal cartridge connecting structure 16 is held in a position in which retaining surface 62 of latch 22 engages latching portion 82 of cartridge connecting structure 16. As noted above, cartridge connecting structure 16 is pivotally mounted with respect to blade unit 14. In FIG. 10, blade unit 14 is shown at the limit of pivoting at the most open orientation with respect to cartridge connecting structure 16, and thus latching portion 82 cannot move downward from the position shown in FIG. 10 and cannot move rearward (to the right) out of region 92 owing to interference by retaining surface 62. In the cartridge storage position shown in FIG. 10, there is no deflection of latch 22 from its undeflected position, and there thus is zero or minimal force of latch 22 on cartridge connecting structure 16. If there were a slight deflection of latch 22 outward, or if tolerances permitted a slightly more open orientation of cartridge connecting structure 16 and blade unit 14 or a slight space between latching portion 82 and retaining surface 62, latching portion 82 of cartridge connecting structure 16 could move slightly rearward (to the right) and contact a different position of retaining surface 62; latching portion 82, however, is prevented from clearing blocking surface 56a of latch 22 in the absence of a very large deflection of latch 22 outward (i.e., upward in FIG. 10).

In use, when a shaver desires to replace a cartridge 12 on handle 63, the presently mounted cartridge 12 is ejected using button 68 and discarded (or inserted into a vacant section 20 in a dispenser 10, as is discussed below). Then an used cartridge 12 in dispenser 10 is connected to handle 63 by moving extension 66 into mating recess 67 along connection axis 72. FIG. 10 shows the position of cartridge connecting structure 16 in dispenser 10 during storage and prior to connection to handle 63. FIG. 11 shows the position of handle connecting structure 64 as cam surface 70 on handle 63 first contacts latch camming structure 54 of latch 22 on dispenser 10. FIG. 12 shows the initial deflection of latch 22 as handle connecting structure 64 is inserted further, and FIG. 13 shows handle connecting structure 64 connected to cartridge connecting structure 16.

The user is prevented from connecting handle 63 to cartridge 12 in the wrong orientation owing to asymmetrical features of handle 63 with respect to connection axis 72. Two of these features are the asymmetrical shape of extension 66 and the mating key/keyway feature of semicircular platform 74. These two features prevent insertion of extension 66 all of the way into recess 67 with engagement of detents 83 with depressions 85 unless handle 63 is in the proper orientation (i.e., not upside down) with respect to cartridge connecting structure 16 regardless of whether the cartridge is in dispenser 10 or not. Two other features, button 68 and transition portion 71, prevent a user from even bringing handle connecting structure 64 into proximity with a cartridge 12 in dispenser 10 owing to the angled arrangement of storage sections 20. When handle 63 is in the proper orientation shown in FIG. 11, button 68 and transition portion 71 are on the side of connection axis 72 closer to the front angled divider 42 (see FIGS. 1, 5, and 11), are clear of the rear angled divider 42, and are not blocked by any structure on dispenser 10. If a user attempts to attach a cartridge 12 with handle 63 upside down, button 68 and transition portion 71 will be on the side of axis 72 closest to the rear divider 42 and will be blocked by it. Thus, owing to the use of angled dividers on dispenser 10, button 68 and transition portion 71 act as blocking structures making it more likely that the user place handle 63 in the proper orientation before attempting to connect it to a cartridge 12 in dispenser 10.

Assuming that handle 63 is in the proper orientation shown in FIG. 11, as handle connecting structure 64 is moved along connection axis 72, cam surface 70 contacts cam follower structure 54 of latch 22 (FIG. 11) and, with continued insertion along axis 72, cam surface 70 biases the end of cantilevered latch 22 outward (FIG. 12). As latch 22 moves outward, its cantilevered arm bends primarily near the base (see FIGS. 4, 6), and blocking surface 56a (FIG. 6) moves substantially along the plane of its surface (perpendicular to longitudinal axis 56b through lower portion 44). As handle connecting structure 64 is inserted further along axis 72, latch 22 rides up onto platform 74 to an unlatched position clearing the cartridge structure prior to, or simultaneously with, detent 83 snapping into place in depression 85 in the connected position shown in FIG. 13. Recessed region 78 provides a region in cartridge connecting structure 16 for receiving cam surface 70 in the connected position. If the user tilts handle 63 upward at this time, or if the user so tilts handle 63 during attachment or removal, latch 22 can deflect further and ride up above platform 74 into recessed region 73 in button 68 (FIG. 14) without risk of breaking latch 22.

Figure 15:
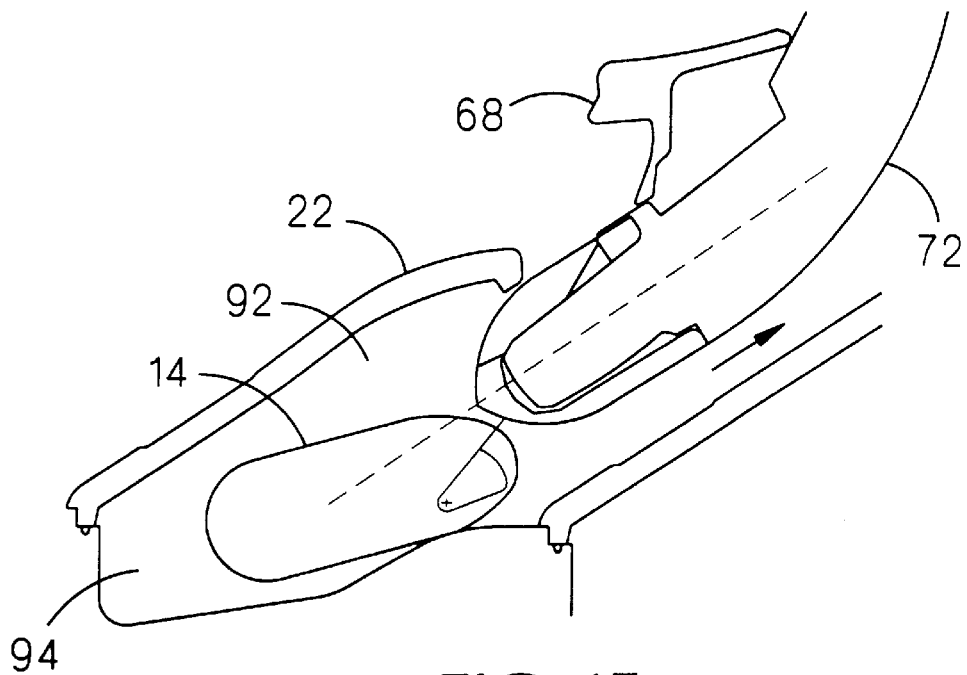
Figure 16:
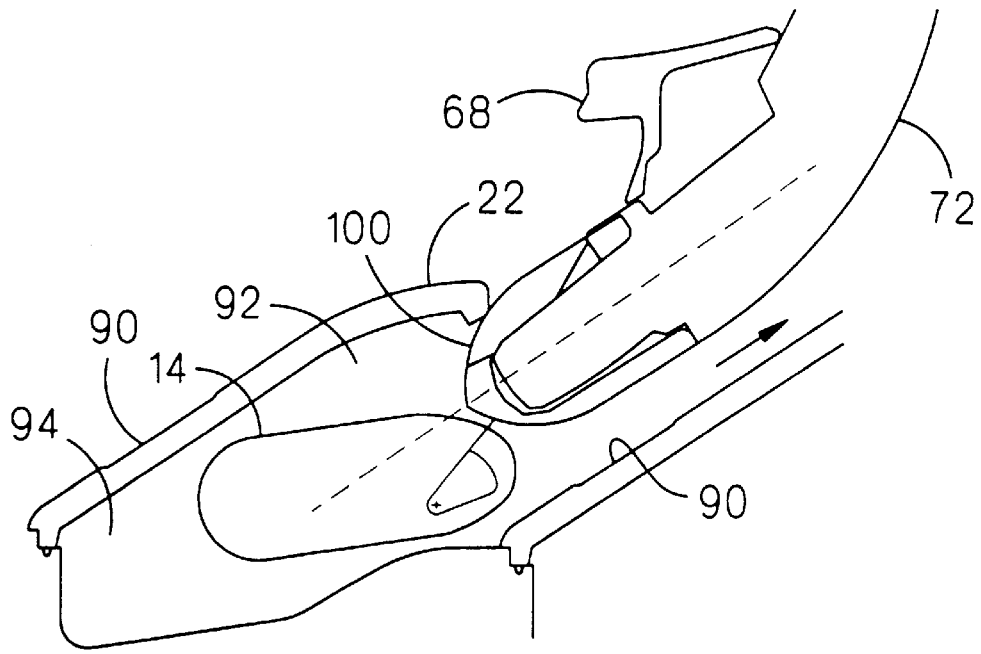

The user then retracts handle 63 and connected cartridge 12 from dispenser 10, typically along the same axis along which the handle travelled during connection, namely connection axis 72. Cartridge moves from the initially connected position of FIG. 13 to the initial retraction position of FIG. 15 and the further retracted position of FIG. 16. Because latch 22, which is a resilient cantilevered structure, is still in a deflected position during initial retraction when latch 22 rides over the outside of cartridge connecting structure 16 (FIGS. 15 and 16), latch 22 exerts a biasing force on cartridge connecting structure 16. In the position of FIG. 16, where latch 22 contacts the curved front surface 100 of connecting structure 16, the biasing force exerted by latch 22 has a component along axis 72, and this assists in ejecting the connected cartridge from the dispenser 10.

As the handle and connected cartridge move further outward from the position shown in FIG. 16, blade unit 14 passes latch 22. If latch 22 contacts the back of blade unit 14 at this time, latch 22 will ride over cross bar 41 on the back of blade unit 14 (FIG. 2), which is perpendicular to the blades and is aligned with latching portion 82. Latch 22 thus will not get caught on other structure (e.g., perpendicular portions of the housing of blade unit 14) on the back of blade unit 14. Cross bar 41 also provides strength to blade unit 14 and has a camming surface that is acted upon by spring biased plunger 61.

When a user wishes to replace a cartridge 12 after it has been used for shaving, the cartridge can be returned to dispenser 10 by insertion along connection axis 72 and ejection of the cartridge using button 68. Prior to ejection, latch 22 rides on platform 74. If the handle is tilted upward (e.g., as shown in FIG. 14) prior to ejection, latch 22 will move into recessed region 73. The cartridge will automatically be engaged by latch 22, as the handle 63 is retracted, and latch 22 will ride down platform 74 and cam surface 70 during retraction. Liquid on a used blade unit 14 stored in dispenser 10 can drain through drainage holes 53 (FIG. 5).

Other embodiments of the invention are within the scope of the claims.

What is claimed is:

1. A cartridge dispenser for a razor blade cartridge used with a handle comprising a housing structure defining a cartridge receiving section for receiving a respective cartridge retained in said section in a predetermined position permitting connection of said respective cartridge to a handle connecting structure on said handle as said handle is moved toward said cartridge, and a latch that is carried by the housing structure and has a latch camming structure and a cartridge retaining portion extending within said cartridge receiving section of the housing structure, said latch camming structure being shaped and positioned to interact with corresponding handle structure to cause said latch to be deflected to an unlatched position in which said cartridge retaining portion release said cartridge as said handle is moved toward and connected to a cartridge connecting structure of said cartridge.

2. The dispenser of claim 1 wherein said latch is for retain the respective cartridge in said section.

3. The dispenser of claim 1 wherein said housing structure defines further sections for receiving further respective cartridges retained in said further sections in predetermined positions permitting connection of said further respective cartridges to a handle connecting structure on said handle as said handle is moved toward said respective cartridges and further comprising further respective latches for said further respective cartridges, each said further respective latch having a latch camming structure that is shaped and positioned to interact with corresponding handle structure to cause said further latch to be deflected and to release said cartridge as said handle is moved toward and connected to a cartridge connecting structure of said further respective cartridge.

4. The dispenser of claim 3 further comprising razor blade cartridges retained in respective said sections.

5. The dispenser of claim 1 wherein said latch camming structure includes a cam follower, and said corresponding handle structure includes a cam surface.

6. The dispenser of claim 1 wherein said latch camming structure includes a latch cam surface.

7. The dispenser of claim 1 in which said housing structure is made of a bottom part and a top part that have been connected together.

8. A cartridge dispenser for razor blade cartridges used with a handle comprising a housing structure defining sections for receiving respective cartridges, said housing structure including a base, side walls, and a plurality of cartridge dividers between said sections, said cartridge dividers including angled dividers having upper and lower surfaces that make acute angles with said base and define angled regions for receiving said cartridges, said angled regions being partially bounded by an upper surface of one angled divider and a facing lower surface of an adjacent angled divider, said angled dividers having upper surfaces for extending above uppermost regions of said cartridges when said cartridges are received in said sections.

9. The dispenser of claim 8 in which said housing structure is made of a bottom part and a top part that have been connected together.

10. A cartridge dispenser for razor blade cartridges used with a handle comprising a housing structure defining sections for receiving respective cartridges, said housing structure including a base and plurality of cartridge dividers between said sections, said cartridge dividers including angled dividers that make acute angles with said base and define angled regions for receiving said cartridges, wherein said cartridges each have a blade unit and a cartridge connecting structure for connection to a handle, said cartridge connecting structure extending from said blade unit, wherein said cartridge dividers also include blade unit dividers that extend from said base, are substantially perpendicular to said base, and partially define blade unit regions in which said blade units are received, and wherein said angled dividers extend from the ends of respective said blade unit dividers, and wherein said angled regions lead to respective blade unit regions for delivery of blade units to and removal of blade units from said blade unit regions, and wherein said cartridge connecting structure is received in said angled regions, an angled region of one section partially overlying a blade unit region of an adjacent section, wherein said housing structure is made of a bottom part and a top part that have been connected together, said bottom part including said base and said blade unit dividers, said top part including said angled regions.

11. The dispenser of claim 7, 9, or 10 wherein said bottom part and said top part are made of molded plastic.

12. The dispenser of claim 7, 9, or 10 wherein said bottom part and said top part are made of molded plastic, and wherein said bottom part and top part are connected to each other by ultrasonic welding.

13. The dispenser of claim 1 or 8 wherein said housing structure has drainage holes associated with respective sections.

14. A cartridge dispenser for razor blade cartridges used with a handle comprising a housing structure defining sections for receiving respective cartridges, said housing structure including a base, side walls, and a plurality of cartridge dividers between said sections, said cartridge dividers including angled dividers having upper and lower surfaces that make acute angles with said base and define angled regions for receiving said cartridges, said angled regions being partially bounded by an upper surface of one angled divider and a facing lower surface of an adjacent angled divider, wherein said cartridges each have a blade unit and a cartridge connecting structure for connecting to a handle, said cartridge connecting structure extending from said blade unit, wherein said cartridge dividers also include blade unit dividers that extend from said base, are substantially perpendicular to said base, and partially define blade unit regions for receiving said blade units, and wherein said angled dividers extend from the ends of respective said blade unit dividers, and wherein said angled regions lead to respective blade unit regions for delivery of blade units to and removal of blade units from said blade unit regions, and wherein said angled regions are adapted for receiving said cartridge connecting structure, an angled region of one section partially overlying a blade unit region of an adjacent section.

15. A cartridge dispenser for a razor blade cartridge used with a handle comprising a housing structure defining a section for receiving a respective cartridge retained in said section in a predetermined position permitting connection of said respective cartridge to a handle connecting structure on said handle as said handle is moved toward said cartridge, and a latch having a latch camming structure that is shaped and positioned to interact with corresponding handle structure to cause said latch to be deflected and to release said cartridge as said handle is moved toward and connected to a cartridge connecting structure of said cartridge, wherein said housing structure defines further sections for receiving further respective cartridges retained in said further sections in predetermined positions permitting connection of said further respective cartridges to a handle connecting structure on said handle as said handle is moved toward said respective cartridges and further comprising further respective latches for said further respective cartridges, each said further respective latch having a latch camming structure that is shaped and positioned to interact with corresponding handle structure to cause said further latch to be deflected and to release said cartridge as said handle is moved toward and connected to a cartridge connecting structure of said further respective cartridge wherein said housing structure has a base and a plurality of cartridge dividers extending upward from said base and defining said sections, and wherein said latches are located at said cartridge dividers.

16. The dispenser of claim 15 wherein said latches are located at midportions of said dividers.

17. The dispenser of claim 15 wherein said latches have resilient cantilevered arms that extend from said cartridge dividers and have ends with said latch camming structure extending from one side of said latches.

18. The dispenser of claim 15 wherein said latches have resilient cantilevered arms that extend from said cartridge dividers and have ends with said latch camming structure extending from one side of said latches and blocking surfaces that are substantially perpendicular to said arms for blocking removal of said cartridges.

19. The dispenser of claim 15 wherein said latches include resilient cantilevered arms extending from said cartridge dividers and ends that each have said latch camming structure extending from one side of said latches, and wherein said cartridge dividers have spaces nearby said ends of said cantilevered arms to receive said handle connecting structure.

20. A cartridge dispenser for razor blade cartridges used with a handle comprising a housing structure defining sections for receiving respective cartridges, said housing structure including a base and plurality of cartridge dividers between said sections, said cartridge dividers including angled dividers that make acute angles with said base and define angled regions for receiving said cartridges, wherein said housing structure includes side walls, and said angled dividers have first portions that extend between the side walls closer to said base and second portions that extend upward from the first portions but are not connected to said side walls.

21. A cartridge dispenser for razor blade cartridges used with a handle comprising a housing structure defining sections for receiving respective cartridges, said housing structure including a base and plurality of cartridge dividers between said sections, said cartridge dividers including angled dividers that make acute angles with said base and define angled regions for receiving said cartridges, further comprising a latch associated with each said section, and wherein said cartridges can be retained in said sections in predetermined positions by a respective latch permitting connection of a respective said cartridge to a handle connecting structure on said handle as said handle is moved toward said cartridge, each said latch having a latch camming structure that is shaped and positioned to interact with a corresponding handle camming structure on said handle so as to cause said latch to be deflected and to release said cartridge as said handle is moved toward and connected to a cartridge connecting structure of said cartridge.

22. The dispenser of claim 21 wherein said latches retain said cartridges in said sections.

23. The dispenser of claim 21 wherein said latch camming structure includes a cam follower, and said handle camming structure includes a cam surface.

24. The dispenser of claim 23 further comprising said razor blade cartridges retained in respective said sections, and wherein said cartridge connecting structure connects to said handle by movement of said handle along a connection axis toward said cartridge connecting structure, and wherein said cartridge connecting structure includes a recessed portion for receiving said cam surface on said handle as said handle is moved along said connection axis.

25. The dispenser of claim 23 further comprising razor blade cartridges retained in respective said sections, and wherein said cartridge connecting structure has inwardly directed surfaces for mating with outwardly directed surfaces of said handle connecting structure, wherein said cartridge connecting structure connects to said handle by movement of said handle along a connection axis toward said cartridge connecting structure, wherein said cartridge connecting structure includes a latching portion that is engaged by said latch and a recessed portion adjacent said latching portion for receiving said cam surface on said handle as said handle is moved along said connection axis.

26. The dispenser of claim 25 wherein said recessed portion has an inwardly directed angled surface.

27. The dispenser of claim 21 wherein said latches have resilient cantilevered arms that extend from said cartridge dividers and have ends with said latch camming structure extending from one side of said latches.

28. The dispenser of claim 21 wherein said latches have resilient cantilevered arms that extend from said cartridge dividers and have ends with said latch camming structure extending from one side of said latches and blocking surfaces that are substantially perpendicular to said arms for blocking removal of said cartridges.

29. The dispenser of claim 21 further comprising razor blade cartridges retained in respective said sections.

30. The dispenser of claim 29 wherein said cartridges have blades and cartridge end structures outside of and above said blades, and said housing structure has raised members on which said cartridge end structures are supported so as to avoid contact of said blades with said housing structure.

31. The dispenser of claim 21 wherein said latches include resilient cantilevered arms extending from said cartridge dividers and ends that each have said latch camming structure extending from one side of said latches, and wherein said cartridge dividers have spaces nearby said ends of said cantilevered arms to receive said handle connecting structure.

32. A cartridge dispenser for razor blade cartridges used with a handle comprising
    a housing structure defining sections for receiving respective cartridges
    said housing structure including a base and plurality of cartridge dividers between said sections,
    said cartridge dividers including angled dividers that make acute angles with said base and define angled regions for receiving said cartridges, wherein said cartridges each have a blade unit and a cartridge connecting structure for connection to a handle, said cartridge connecting structure extending from said blade unit,
    wherein said cartridge dividers also include blade unit dividers that extend from said base, are substantially perpendicular to said base, and partially define blade unit regions in which said blade units are received, and
    wherein said angled dividers extend from the ends of respective said blade unit dividers, and wherein said angled regions lead to respective blade unit regions for delivery of blade units to and removal of blade units from said blade unit regions, and wherein said cartridge connecting structure is received in said angled regions,
    an angled region of one section partially overlying a blade unit region of an adjacent section,
    wherein said angled dividers make an angle of greater than 30° with said base.

33. A combination of a cartridge dispenser for a plurality of razor blade cartridges used with a handle and said plurality of razor blade cartridges comprising
    a housing structure defining a section for receiving a respective said cartridge retained in said section in a predetermined position permitting connection of said respective cartridge to a handle connecting structure on said handle as said handle is moved toward said cartridge, and
    a latch having a latch camming structure that is shaped and positioned to interact with corresponding handle structure to cause said latch to be deflected and to release said cartridge as said handle is moved toward and connected to a cartridge connecting structure of said cartridge,
    wherein said housing structure defines further sections for receiving further respective said cartridges retained in said further sections in predetermined positions permitting connection of said further respective cartridges to a handle connecting structure on said handle as said handle is moved toward said respective cartridges and further comprising further respective latches for said further respective cartridges, each said further respective latch having a latch camming structure that is shaped and positioned to interact with corresponding handle structure to cause said further latch to be deflected and to release said cartridge as said handle is moved toward and connected to a cartridge connecting structure of said further respective cartridge,
    further comprising said razor blade cartridges retained in respective said sections,
    wherein said cartridges have blades and cartridge end structures outside of and above said blades, and said housing structure has raised members on which said cartridge end structures are supported so as to avoid contact of said blades with said housing structure.

34. A method of making a dispenser for razor blade cartridges comprising
    providing a bottom plastic part including a base and a top plastic part, said bottom part including bottom divider portions and said top part including top divider portions defining sections for receiving respective razor blade cartridges, and
    permanently connecting said bottom plastic part to said top plastic part by ultrasonically welding them together, respective top and bottom divider portions being welded together.

35. A method of making a dispenser for razor blade cartridges comprising
    providing a bottom plastic part including a base and a top plastic part, said parts defining sections for receiving respective razor blade cartridges,
        said bottom part including blade unit dividers that extend from said base, are substantially perpendicular to said base, and define blade unit regions in which blade units of said cartridges are to be received,
        said top part including angled dividers that are sized to extend from the ends of respective blade unit dividers at acute angles with said base so as to define angled regions through which said blade units will pass in delivery to and removal from said blade unit regions and in which cartridge connecting structures of said cartridges can be received, and
    permanently connecting said bottom plastic part to said top plastic part such that said angled dividers are aligned with respective blade unit dividers.

36. The method of claim 35 wherein said permanently connecting includes ultrasonically welding said bottom part and said top part together, said ultrasonically welding including welding said blade unit dividers to said angled dividers.

* * * * *